United States Patent
Han et al.

(10) Patent No.: US 11,797,360 B2
(45) Date of Patent: Oct. 24, 2023

(54) METHOD FOR GENERATING TOPOLOGY DIAGRAM, ANOMALY DETECTION METHOD, DEVICE, APPARATUS, AND STORAGE MEDIUM

(71) Applicant: ZTE CORPORATION, Shenzhen (CN)

(72) Inventors: Jing Han, Shenzhen (CN); Jianwei Liu, Shenzhen (CN); Xinyou Dong, Shenzhen (CN); Zheng Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 5 days.

(21) Appl. No.: 17/782,519

(22) PCT Filed: Nov. 19, 2020

(86) PCT No.: PCT/CN2020/130033
§ 371 (c)(1),
(2) Date: Jun. 3, 2022

(87) PCT Pub. No.: WO2021/109874
PCT Pub. Date: Jun. 10, 2021

(65) Prior Publication Data
US 2023/0004451 A1 Jan. 5, 2023

(30) Foreign Application Priority Data
Dec. 3, 2019 (CN) .......................... 201911222482.4

(51) Int. Cl.
*G06F 9/54* (2006.01)
(52) U.S. Cl.
CPC .................................. *G06F 9/542* (2013.01)

(58) Field of Classification Search
CPC ...... G06F 9/542; G06F 16/1734; H04L 41/06; H04L 41/0604
See application file for complete search history.

(56) References Cited

U.S. PATENT DOCUMENTS 10,417,063 B2 * 9/2019 Ofer ..................... G06F 11/3072
10,678,610 B2 * 6/2020 Ebrahimi ............ G06F 11/3409
(Continued)

FOREIGN PATENT DOCUMENTS

| CN | 105630800 A | 6/2016 |
|---|---|---|
| CN | 110427299 A | 11/2019 |
| CN | 110515758 A | 11/2019 |

OTHER PUBLICATIONS

International Search Report for Application No. PCT/CN2020/130033, dated Feb. 24, 2021, 4 pages including English translation.

*Primary Examiner* — Andy Ho
(74) *Attorney, Agent, or Firm* — Morgan, Lewis & Bockius LLP

(57) ABSTRACT

Provided are a method and apparatus for generating a topological graph, an anomaly detection method and apparatus, a device and a storage medium. The method for generating a topological graph includes acquiring a preset event stream, where the preset event stream corresponds to a normal log execution path; determining a dependent event pair in the preset event stream; determining a range of a transfer interval corresponding to the dependent event pair, where a transfer interval represents the time difference between adjacent occurrences of two events in the dependent event pair; and generating an event topological graph according to the range of the transfer interval and the transfer probability corresponding to the dependent event pair, where the transfer probability represents the conditional probability between the two events in the dependent event pair.

20 Claims, 6 Drawing Sheets

(56) References Cited

U.S. PATENT DOCUMENTS

| | | | |
|---|---|---|---|
| 11,683,237 B2 * | 6/2023 | Pronk | H04L 41/14 709/224 |
| 2019/0057138 A1 | 2/2019 | Knowles et al. | |
| 2020/0160189 A1 * | 5/2020 | Bhattacharjya | G06N 5/022 |

* cited by examiner

METHOD FOR GENERATING TOPOLOGY DIAGRAM, ANOMALY DETECTION METHOD, DEVICE, APPARATUS, AND STORAGE MEDIUM

CROSS-REFERENCE TO RELATED APPLICATIONS

This is a National Stage Application filed under 35 U.S.C. 371 based on International Patent Application No. PCT/CN2020/130033, filed on Nov. 19, 2020, which claims priority to Chinese Patent Application No. 201911222482.4 filed on Dec. 3, 2019, the disclosures of both of which are incorporated herein by reference in their entireties.

TECHNICAL FIELD

The present application relates to the field of computer technologies, for example, to a method and apparatus for generating a topological graph, an anomaly detection method, an apparatus, a device, and a storage medium.

BACKGROUND

To satisfy the increasingly rich demands of users, modern software systems are becoming larger and more complex. When an anomaly occurs in a software system, it is crucial to detect the problem and find the cause. A system log records important system events and system status, helps system operation and maintenance personnel debug the system performance problems and anomalies and is a valuable resource to understand the system status. However, the system log is unstructured, so it is very difficult to locate a system anomalous event accurately and efficiently from the complex system log according to the experience of the operation and maintenance personnel. The related solutions in the related art can hardly perform the log anomaly detection accurately and thereby need improving.

SUMMARY

The present application provides a method and apparatus for generating a topological graph, an anomaly detection method and apparatus, a device and a storage medium.

Embodiments of the present application provide a method for generating a topological graph. The method includes acquiring a preset event stream, where the preset event stream corresponds to a normal log execution path; determining a dependent event pair in the preset event stream; determining a range of a transfer interval corresponding to the dependent event pair, where a transfer interval in the range of the transfer interval represents a time difference between adjacent occurrences of two events in the dependent event pair; generating an event topological graph according to the range of the transfer interval and a transfer probability corresponding to the dependent event pair, where the transfer probability represents a conditional probability between the two events in the dependent event pair.

Embodiments of the present application provide an anomaly detection method. The method includes acquiring a to-be-detected event stream, where the to-be-detected event stream corresponds to a to-be-detected log execution path; comparing the to-be-detected event stream with an event topological graph, where the event topological graph is generated by using the method for generating a topological graph according to the embodiments of the present application; and determining whether the to-be-detected event stream is anomalous according to a comparison result.

Embodiments of the present application provide an apparatus for generating a topological graph. The apparatus includes a preset event stream acquisition module configured to acquire a preset event stream, where the preset event stream corresponds to a normal log execution path; a dependent event pair determination module configured to determine a dependent event pair in the preset event stream; a transfer interval range determination module configured to determine a range of a transfer interval corresponding to the dependent event pair, where a transfer interval in transfer interval range represents a time difference between the occurrence time of two events in the dependent event pair; and a topological graph generation module configured to generate an event topological graph according to the range of the transfer interval and a transfer probability corresponding to the dependent event pair, where the transfer probability represents a conditional probability between the two events in the dependent event pair.

Embodiments of the present application provide an anomaly detection apparatus. The apparatus includes a to-be-detected event stream acquisition module configured to acquire a to-be-detected event stream, where the to-be-detected event stream corresponds to a to-be-detected log execution path; a comparison module configured to compare the to-be-detected event stream with an event topological graph, where the event topological graph is generated by using the method for generating a topological graph according to the embodiments of the present application; and an anomaly detection module configured to determine whether the to-be-detected event stream is anomalous according to a comparison result.

Embodiments of the present application provide a computer device. The device includes a processor and a memory. The processor is configured to execute a program stored in the memory to perform any method of the embodiments of the present application.

Embodiments of the present application provide a non-transitory storage medium storing a computer program which, when executed by a processor, causes the processor to perform any method of the embodiments of the present application.

The preceding embodiments and other aspects of the present application and implementations thereof are described in more detail in the brief description of drawings, detailed description and claims.

DETAILED DESCRIPTION

Embodiments of the present application are described below in conjunction with drawings.

Figure 1:
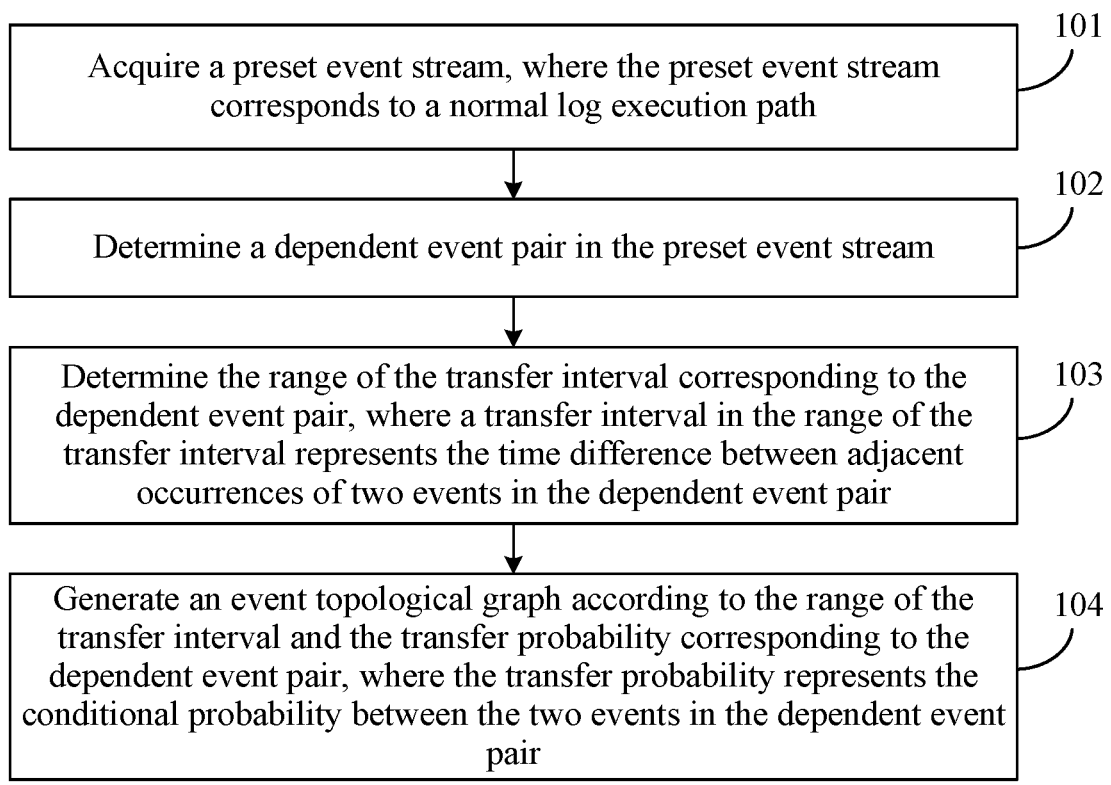
FIG. 1 is a flowchart of a method for generating a topological graph according to embodiments of the present application.

FIG. 1 is a flowchart of a method for generating a topological graph according to embodiments of the present application. The method is executable by an apparatus for generating a topological graph. The apparatus may be implemented by software and/or hardware and may be generally integrated on a computer device. As shown in FIG. 1, the method includes the steps below.

In S101, a preset event stream is acquired, where the preset event stream corresponds to a normal log execution path.

A system log is unstructured. Different systems often have different log structures, and a software system may execute multiple tasks in parallel, thereby resulting in the output system logs often intertwined. In the process of log operation and maintenance, a system operator can hardly set parameters of this field accurately due to an incomprehensive understanding of the professional knowledge in this field. Second, the system log data is complex and huge, so it is often difficult to achieve a satisfactory accuracy. In the related art, there is a workflow-based solution, but there is a lack of a solution that can accurately mine the workflow graph representing the normal execution process of the system from a large amount of complex log information.

In this embodiment of the present application, the preset event stream (also known as the preset transaction stream) corresponding to the normal log execution path is acquired first, then analysis and mining are performed based on the preset event stream, and an event topological graph for log anomaly analysis is generated finally and can represent the normal execution process of the system accurately.

Exemplarily, a preset log stream (equal to an original log stream) corresponding to the normal log execution path may be acquired first and is then converted to a corresponding preset event stream according to a log template. A system log may be classified into two parts: a fixed part and a variable part. The fixed part is the fixed part of the original log entry and does not change with the change of the system status while the variable part changes with the change of the system status. The log template is abstracted from an original log. For example, the variable part may be replaced by a placeholder *, and each log template may correspond to one log output sentence as much as possible. That is, each log template corresponds to one event or one event type. More than two logs in the preset log stream may correspond to the same log template. That is, the same event may occur more than twice in the preset log stream. For ease of description, an event mentioned in this embodiment of the present application may be regarded as one event type, for example, event A. Each occurrence of event A in the preset event stream may be regarded as one embodiment of event A.

The log template may be preconfigured, or a log in the unstructured preset log stream may be parsed into a structured log template by use of log parsing.

In S102, a dependent event pair in the preset event stream is determined.

In this step, the dependent event pair in the preset event stream is mined. An event pair is the basic unit constituting an event stream graph. For one event pair, the dependency relationship between two events is characterized by the time relationship between the two events. For example, an event pair (A, B) represents that event B always occurs after event A. The dependent event pair may be regarded as an event pair satisfying the set dependency relationship. In the dependent event pair, an event occurring ahead may be called a precursor event while an event occurring behind may be called a subsequent event.

Optionally, the dependent event pair in the preset event stream may be determined according to the conditional probability of two events.

Optionally, the determined dependent event pair may be added to a dependent event pair set.

In S103, the range of the transfer interval corresponding to the dependent event pair is determined, where a transfer interval in the range of the transfer interval represents the time difference between adjacent occurrences of two events in the dependent event pair.

Exemplarily, the transfer interval, that is, the interval of transfer time, may reflect the volatility of the transfer time of a system event effectively, and the time difference between occurrences of all instances corresponding to each dependent event pair in the preset event stream may be analyzed to determine the range of the transfer interval that may represent the normal range of the time difference between adjacent occurrences of two events in the dependent event pair and is determined in unlimited manners.

In S104, an event topological graph is generated according to the range of the transfer interval and the transfer probability corresponding to the dependent event pair, where the transfer probability represents the conditional probability between the two events in the dependent event pair.

Exemplarily, the event topological graph (ETG) having a set structure may be generated according to two dimensions: the transfer probability corresponding to the dependent event pair and the range of the transfer interval corresponding to the dependent event pair, where the set structure may be a tree structure.

In one embodiment, the event topological graph includes multiple nodes, a node represents an event in the dependent event pair, and the connection between two nodes includes the transfer probability and the range of the transfer interval corresponding to the dependent event pair represented by the two nodes. That is, in the event topological graph, a node may be an event in a dependent event pair, and the transfer probability and the range of the transfer interval corresponding to the dependent event pair represented by the two nodes may be marked on the connection line between the two nodes.

In this manner, the generated event topological graph includes the standard information of the normal log event stream in the two dimensions: the conditional probability of event occurrence and the time interval of occurrence and can be detected in these two dimensions to improve the detection accuracy when being used for log anomaly detection.

In the method for generating a topological graph provided by this embodiment of the present application, the preset event stream corresponding to the normal log execution path is acquired, the dependent event pair in the preset event stream is determined, the range of the transfer interval corresponding to the dependent event pair is determined, and the event topological graph is generated according to the range of the transfer interval and the transfer probability corresponding to the dependent event pair, where the transfer probability represents the conditional probability between two events. With the preceding technical solution adopted, the generated event topological graph includes the standard information of the normal log event stream in the two dimensions: the conditional probability of event occurrence and the time interval of occurrence and can be detected in these two dimensions to improve the detection accuracy when being used for log anomaly detection.

In one exemplary embodiment, that the event topological graph is generated according to the range of the transfer interval and the transfer probability corresponding to the dependent event pair includes that the maximum spanning tree is generated by using events included in the dependent event pair as nodes and by using the transfer probability corresponding to the dependent event pair as the edge weight between the nodes, and the range of the transfer interval corresponding to the dependent event pair is added to the edge in the maximum spanning tree to obtain the event topological graph. The advantage of this configuration is that an efficient and reasonable event topological graph can be generated so that the accuracy of log anomaly detection can be improved. Exemplarily, in graph theory, the spanning tree of one graph is a subgraph including all nodes and is generally represented as a tree, and the maximum spanning tree is a spanning tree having a weight value graph having the maximum weight value. In this embodiment of the present application, the maximum transfer probability between paths may be used as the target function to generate the maximum spanning tree, and the corresponding transfer interval range is added to the edge of the maximum spanning tree. That is, for the edge between two nodes, the range of the transfer interval corresponding to a dependent event pair corresponding to the two nodes is marked on the edge.

In one exemplary embodiment, that the preset event stream is acquired includes that a preset log stream is acquired, where the preset log stream corresponds to the normal log execution path; logs in the preset log stream are parsed by using a preset log parsing algorithm to obtain multiple log templates, where each log template corresponds to one event; and the preset log stream is converted into the preset event stream corresponding to the preset log stream according to the multiple log templates. The advantage of this configuration is that the multiple log templates are generated based on the preset log stream so that the multiple log templates can match the logs in the preset log stream better, thereby obtaining the corresponding event stream more accurately. The preset log parsing algorithm may be, for example, Basic Signature Generation (BSG), Log Key Extraction (LKE) and Iterative Partitioning Log Mining (IPLoM).

Exemplarily, the preset log stream may be represented as $<l_1, l_2, \ldots l_n>$ and is assumed as shown in Table 1.

TABLE 1

Preset log stream 2018-12-11 20:14:02.825 INFO nan cloudframe.pdman.cmd.worker Configuration:
2018-12-11 20:14:02.829 WARNING nan oslo_config.cfg Option """rabbit_hosts""" from group """oslo_messaging_rabbit""" is deprecated for removal. Its value may be silently ignored in the future.
2018-12-11 20:14:02.829 WARNING nan oslo_config.cfg Option """rabbit_max_retries""" from group """oslo_messaging_rabbit""" is deprecated for removal. Its value may be silently ignored in the future.
2018-12-11 20:14:03.067 INFO nan sqlalchemy.orm.mapper.Mapper (Server|servers)_configure_property(node_list, RelationshipProperty)req-f3eaa3dd-321d-44db-b705-937a1c26a01b.
2018-12-11 20:14:03.068 INFO nan sqlalchemy.orm.mapper.Mapper (Server|servers)_configure_property(created_at, Column)req-f3eaa3dd-321d-44db-b705-937a1c26a01b
2018-12-11 20:14:03.069 INFO nan sqlalchemy.orm.mapper.Mapper (Server|servers)_configure_property(updated_at, Column)req-f3eaa3dd-321d-44db-b705-937a1c26a01b A corresponding log template $<e_1, e_2, \ldots e_m>$, $m<n$ may be obtained by using a preset log parsing algorithm to parse the preset log stream. Each log template represents one event type. For example, the log template obtained by performing log parsing on the preset log stream of Table 1 is shown in Table 2.

| template | Event_id |
| --- | --- |
| Configuration: | 1 |
| Option * from group "oslo_messaging_rabbit" is deprecated for removal. Its value may be silently ignored in the future. | 2 |
| (Server|servers) * RelationshipProperty) <req-param> | 3 |
| (Server|servers) * Column) <req-param> | 4 |

Template represents the log template. Eevent_id represents the corresponding event type.

The preset log stream is converted into the preset event stream according to the log template. As shown in the preceding example, a transaction stream corresponding to the preset log stream $l_1, l_2, l_3, l_4, l_5, l_6$ is $e_1, e_2, e_2, e_3, e_4, e_4$.

In one exemplary embodiment, that the dependent event pair in the preset event stream is determined includes that for each event occurring in the preset event stream, a candidate subsequent event set corresponding to the current event is determined; whether the first preset dependency relationship is satisfied between the current event and each candidate subsequent event in the candidate subsequent event set corresponding to the current event is determined; and a candidate subsequent event satisfying the first preset dependency relationship is determined as a subsequent event and is added to a subsequent event set, where the current event and one subsequent event form one dependent event pair. The advantage of this configuration is that for the each event, the each event can serve as a precursor event, the corresponding candidate subsequent event set is determined initially, and then whether an event in the candidate subsequent event set can become a corresponding subsequent event is determined so that the determination efficiency of a dependent event pair can be improved.

In one exemplary embodiment, that the candidate subsequent event set corresponding to the current event is determined includes that a first event existing between every two adjacent occurrences of the current event in the preset event stream is added to an initial candidate subsequent event set; the conditional probability between the current event and each first event is calculated; and a second event is removed from the initial candidate subsequent event set to obtain the candidate subsequent event set corresponding to the current event, where the conditional probability between the current event and the second event is less than a preset conditional probability threshold. The conditional probability may be also called the correlation probability, and the preset conditional probability threshold may be disposed according to practical situations. The advantage of this configuration is that the conditional probability can be used for filtering out the noise events, removing the indirect subsequent events of a precursor event as much as possible and retaining the direct subsequent events of the precursor event so that the determination accuracy of a dependent event pair can be improved.

Optionally, the conditional probability between the current event and the each first event may be calculated by using the following formula:

$$SUP_{(A|B)} = N_{(A|B)}/\min(p_A, p_B) * \text{sigmoid}(\min(p_A, p_B)).$$

A denotes the current event, that is, the precursor event; B denotes the first event in the initial candidate subsequent event set corresponding to A; $p_A$ denotes the occurrence probability of event A; $p_B$ denotes the occurrence probability of event B; and $N_{(A|B)}$ denotes the number of occurrences of event B in the initial candidate subsequent event set corresponding to event A, that is, the number of occurrences of the first event between every two adjacent occurrences of the current event.

In one exemplary embodiment, that whether the first preset dependency relationship is satisfied between the current event and the each candidate subsequent event in the candidate subsequent event set corresponding to the current event is determined includes that for the each candidate subsequent event in the candidate subsequent event set corresponding to the current event, the unconditional distribution of the waiting time of the current candidate subsequent event is calculated; the conditional distribution of the waiting time of the current candidate subsequent event relative to the current event is calculated; and whether the first preset dependency relationship is satisfied between the current event and the current candidate subsequent event is determined according to the unconditional distribution and the conditional distribution, where the waiting time represents the time difference between the occurrence time of the current event and the occurrence time of the current candidate subsequent event. The advantage of this configuration is that a dependent event pair can be determined more accurately.

Exemplarily, a time sequence corresponding to an event is extracted. The time sequence of occurrence of event A is represented as: $S_A = <a_1, a_2, \ldots, a_m>$, where $a_i$, $1 \leq i \leq m$ denotes the timestamp of the log entry of the event type A. Assuming that the range of $S_A$ is between [0, T], given a time point z, the minimum positive distance between z and $S_A$, that is, the waiting time, is $d(z, S_A) = \min\|x-z\|$, $x \in S_A$, $x \geq z$. The unconditional distribution of the waiting time of event B is $F_B(r) = P(d(z, S_B)) \leq r$, where r denotes a threshold parameter of the time interval, and z here corresponds to any event. The conditional distribution of the waiting time of event B relative to event A is: $F_{B|A}(r) = P(d(z, S_B)) \leq r$, $z \in S_A$, where x denotes any point in the sequence $S_A$, z here corresponds to any point in $S_A$, and $F_{B|A}$ describes the conditional probability of event A in any time point x.

In one exemplary embodiment, that whether the first preset dependency relationship is satisfied between the current event and the current candidate subsequent event is determined according to the unconditional distribution and the conditional distribution includes that the first preset dependency relationship is determined to be satisfied between the current event and the current candidate subsequent event in response to the unconditional distribution and the conditional distribution conforming to the normal distribution. The advantage of this configuration is that whether two events are a dependent event pair can be determined quickly and accurately. Optionally, whether the first preset dependency relationship is satisfied between the current event and the current candidate subsequent event may be also measured according to other distribution other than the normal distribution.

Exemplarily, for the event pair (A, B), whether the dependency relationship exists between event A and event B may be determined by comparing $F_B(r)$ with $F_{B|A}(r)$. If $F_B(r)$ is noticeably different from $F_{B|A}(r)$, event B is determined to be dependent on event A. Whether the dependency relationship exists between event A and event B may be determined by calculating whether $M_B$ and $M_{B|A}$ conform to the normal distribution. $M_B$ and $M_{B|A}$ represent the initial value of $F_B(r)$ and the initial value of $F_{B|A}(r)$ respectively, that is, the first moment. The normal distribution here may be construed as determining whether the dependency relationship exists between events by the point sequence of adjacent events.

In one exemplary embodiment, that the range of the transfer interval corresponding to the dependent event pair is determined includes that for each dependent event pair, the time difference sequence corresponding to the current dependent event pair in the preset event stream is acquired and clustered, and the range of the transfer interval corresponding to the current dependent event pair is determined according to the time distribution in the cluster obtained by the clustering, where the time difference sequence includes the time difference between adjacent occurrences of two events in the current dependent event pair. The advantage of this configuration is that redundant events can be removed quickly and efficiently by clustering so that the determination accuracy of a range of a transfer interval can be improved. Two events C and D in a dependent event pair generally occur in the preset event stream for many times. When C and D first occur adjacently, the first time difference between the two is calculated and becomes the first element in the time difference sequence; when C and D second occur adjacently, the second time difference between the two is calculated and becomes the second element in the time difference sequence. In this manner, the time difference sequence corresponding to the dependent event pair is obtained.

In one exemplary embodiment, that the range of the transfer interval corresponding to the current dependent event pair is determined according to the time distribution in the cluster obtained by the clustering includes that the range of the transfer interval corresponding to the current dependent event pair is determined according to the maximum value and the minimum value in the cluster; or the range of the transfer interval corresponding to the current dependent event pair is determined according to a confidence interval of the time distribution in the cluster. The advantage of this configuration is that the range of the transfer interval corresponding to each dependent event pair can be determined quickly.

Exemplarily, a transfer interval sequence between dependent event pairs is acquired. For example, for each mined dependent event pair $<T_i, T_j>$, all adjacent $T_i$ and $T_j$ in the preset event stream are found, and the time difference between all the adjacent $T_i$ and $T_j$ is recorded as the sequence $<t_1, t_2, \ldots, t_m>$. Clustering algorithms are used for the time difference sequence, and redundant events can be removed by clustering. The clustering algorithms that can be used include AGglomerative NESting (AGNES), Divisive ANAlysis Clustering (DIANA) and density-based spatial clustering of applications with noise (DBSCAN). The maximum value and the minimum values of each cluster are taken as the time interval range of an event pair belonging to the each cluster.

In one exemplary embodiment, that the range of the transfer interval corresponding to the current dependent event pair is determined according to the time distribution in the cluster obtained by the clustering includes that the current dependent event pair is tested by using a preset statistical test method, and the range of the transfer interval corresponding to the current dependent event pair is determined according to the time distribution in the cluster in response to passing the test. The advantage of this configuration is that the dependency relationship of a dependent event pair can be verified in time. The preset statistical test method may include a chi-squared test, a Z-test and a t-test. Exemplarily, the chi-squared test is used for testing each cluster. If the each cluster passes the chi-squared test, the dependency relationship is proven to exist between event pairs, and the time interval calculated in the preceding step is used as the range of the transfer interval of an event pair.

In one exemplary embodiment, after the maximum spanning tree is generated, the method further includes that for two nodes in any dependent event pair in the maximum spanning tree, the detour probability that a detour path that exists between the two current nodes is calculated, and the edge between the two current nodes is completed in response to the detour probability being greater than a preset detour probability threshold. The advantage of this configuration is that the generated maximum spanning tree can be perfected so that the accuracy of an event topological graph can be improved.

Exemplarily, the path length between nodes of a spanning tree is calculated. Two any points (the starting point and the ending point) of the spanning tree are denoted as $E_1$ and $E_2$. The distance between $E_1$ and $E_2$ is denoted as $path(E_1, E_2)$. The probability that a detour path that exists between $E_1$ and $E_2$ is: $d(E_1, E_2)=\log(1+path(E_1, E_2))$. Whether the path from $E_1$ to $E_2$ is completed is determined by an appropriate preset detour probability threshold configured by a log sequence.

In one exemplary embodiment, that the edge between the two current nodes is completed includes that the edge is completed by using a sum of weights of all edges passed by a target detour path between the two current nodes as the edge weight between the two current nodes, where the target detour path satisfies that the sum of the weights of the all edges passed by the target detour path is larger than the sum of weights of all edges passed by any other detour path between the two current nodes. The advantage of this configuration is that the missing path between nodes having the dependency relationship but no edge in the spanning tree can be completed quickly and accurately.

Figure 2:
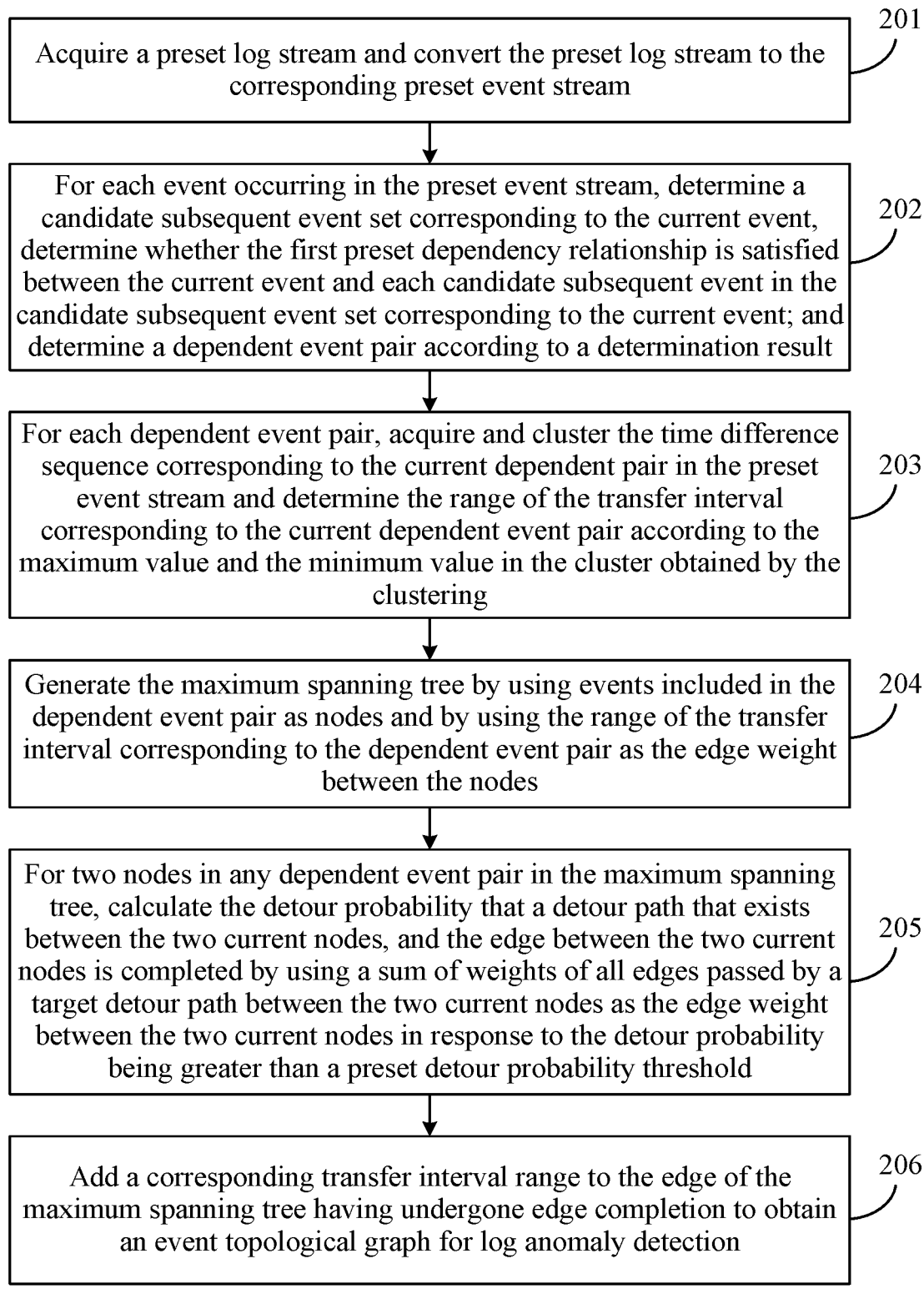
FIG. 2 is a flowchart of another method for generating a topological graph according to embodiments of the present application.

FIG. 2 is a flowchart of another method for generating a topological graph according to embodiments of the present application. As shown in FIG. 2, the method includes the steps below.

In S201, a preset log stream is acquired and converted into the corresponding preset event stream.

In S202, for each event occurring in the preset event stream, a candidate subsequent event set corresponding to the current event is determined, whether the first preset dependency relationship is satisfied between the current event and each candidate subsequent event in the candidate subsequent event set corresponding to the current event is determined, and a dependent event pair is determined according to a determination result.

If the first preset dependency relationship is satisfied between the current event and one candidate subsequent event, the current event and the one candidate subsequent event are determined to be a dependent event pair.

Optionally, a first event existing between every two adjacent occurrences of the current event in the preset event stream is added to an initial candidate subsequent event set, the conditional probability between the current event and each first event is calculated, and a second event whose conditional probability is less than a preset conditional probability threshold is removed from the initial candidate subsequent set to obtain the candidate subsequent event set corresponding to the current event.

Optionally, for the each candidate subsequent event in the candidate subsequent event set corresponding to the current event, the unconditional distribution of the waiting time of the current candidate subsequent event is calculated, the conditional distribution of the waiting time of the current candidate subsequent event relative to the current event is calculated, and the first preset dependency relationship is determined to be satisfied between the current event and the current candidate subsequent event in response to the unconditional distribution and the conditional distribution conforming to the normal distribution. That is, the current event and the current candidate subsequent event are one dependent event pair.

In S203, for each dependent event pair, the time difference sequence corresponding to the current dependent event pair in the preset event stream is acquired and clustered, and the range of the transfer interval corresponding to the current dependent event pair is determined according to the maximum value and the minimum value in the cluster obtained by the clustering.

After the time difference sequence is clustered, the step may further include that a chi-squared test is used for testing the cluster corresponding to the current dependent event pair, and the range of the transfer interval corresponding to the current dependent event pair is determined according to the maximum value and the minimum value in the cluster corresponding to the current dependent event pair in response to passing the test. Optionally, in response to not passing the test, the current dependent event does not have a dependency relationship in time and thereby is deleted from the dependent event pair set.

In S204, the maximum spanning tree is generated by using events included in the dependent event pair as nodes and by using the transfer probability corresponding to the dependent event pair as the edge weight between the nodes.

Exemplarily, a node in a tree represents an event, the edge weight represents the transfer probability between a precursor event and a subsequent event that are connected, and a spanning tree serves as the skeleton of the entire workflow. The available algorithms for generating a spanning tree include Prim's algorithm and Kruskal's algorithm. Modifications may be made to these algorithms. For example, the maximum transfer probability between paths is used as a target function to generate the maximum spanning tree.

In S205, for two nodes in any dependent event pair in the maximum spanning tree, the detour probability that a detour path that exists between the two current nodes is calculated, and the edge between the two current nodes is completed by using a sum of weights of all edges passed by a target detour path between the two current nodes as the edge weight between the two current nodes in response to the detour probability being greater than a preset detour probability threshold.

In S206, a corresponding transfer interval range is added to the edge of the maximum spanning tree having undergone edge completion to obtain an event topological graph for log anomaly detection.

In the method for generating a topological graph according to this embodiment of the present application, the preset log stream corresponding to the normal log execution path is acquired and converted to the preset event stream, the dependent event pair in the preset event stream is mined, the range of the transfer interval corresponding to the dependent event pair is determined by clustering, the maximum spanning tree is generated by using the events included in the dependent event pair as the nodes and by using the transfer probability corresponding to the dependent event pair as the edge weight between the nodes, and after the missing path is completed, the corresponding transfer interval range is added to the edge of the maximum spanning tree to obtain the event topological graph for log anomaly detection. With the preceding technical solution adopted, the generated tree-shaped event topological graph includes the standard information of the normal log event stream in the two dimensions: the conditional probability of event occurrence and the time interval of occurrence and can improve the detection accuracy and the detection efficiency when being used for log anomaly detection.

Figure 3:
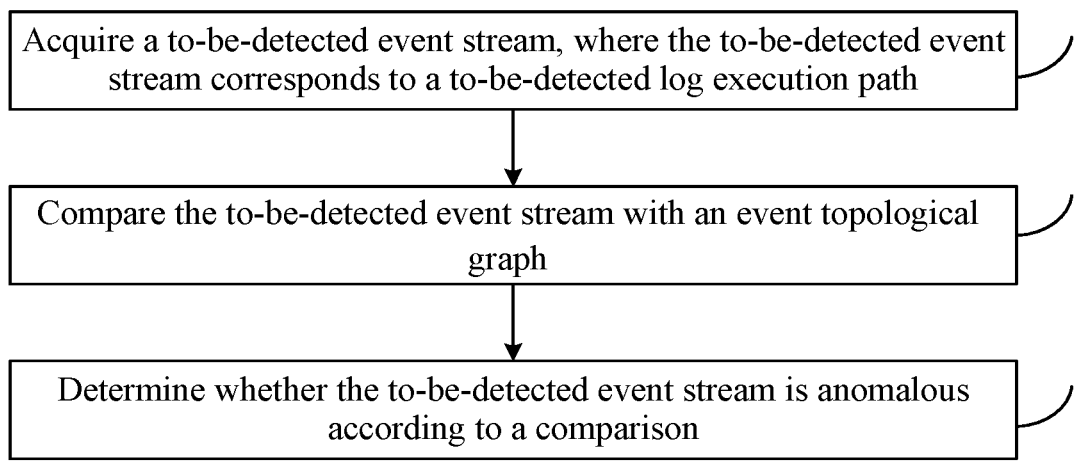
FIG. 3 is a flowchart of an anomaly detection method according to embodiments of the present application.

FIG. 3 is a flowchart of an anomaly detection method according to embodiments of the present application. The method is executable by an anomaly detection apparatus. The apparatus may be implemented by software and/or hardware and may be generally integrated on a computer device. As shown in FIG. 3, the method includes the steps below.

In S301, a to-be-detected event stream is required, where the to-be-detected event stream corresponds to a to-be-detected log execution path.

Exemplarily, the to-be-detected event stream may be converted from a log stream newly generated by the system or from a historically generated log stream that needs anomaly detection. The multiple log templates for generating an event topological graph may be used for converting the to-be-detected log stream into a corresponding to-be-detected event stream.

In S302, the to-be-detected event stream is compared with an event topological graph.

The event topological graph is generated by using the method for generating a topological graph according to the embodiments of the present application. The generation process of the event topological graph may be regarded as the offline stage of anomaly detection. After a high-quality event topological graph is generated, the event topological graph may be used for representing the normal execution path of the system. In the online stage, the to-be-detected event stream is compared with the event topological graph to analyze an anomaly.

In S303, whether the to-be-detected event stream is anomalous is determined according to a comparison result.

Exemplarily, the difference between the to-be-detected event stream and the event topological graph is compared so that whether there is a difference between the current to-be-detected log execution path and the normal log execution path can be found, thereby determining whether there is an anomaly.

In the anomaly detection method according to this embodiment of the present application, the to-be-detected event stream corresponding to the to-be-detected log execution path is compared with the event topological graph generated by using the method for generating a topological graph according to the embodiments of the present application so that whether the to-be-detected event stream is anomalous can be detected quickly and accurately according to the comparison result, thereby improving the accuracy and the efficiency of log anomaly detection.

In one exemplary embodiment, the event topological graph includes multiple nodes, a node represents an event in the dependent event pair, and the connection between two nodes includes the transfer probability and the range of the transfer interval corresponding to the dependent event pair represented by the two nodes. That the to-be-detected event stream is compared with the event topological graph, and whether the to-be-detected event stream is anomalous is determined according to the comparison result includes that for the current event in the to-be-detected event stream, a corresponding target event is searched in the event topological graph; and the to-be-detected event stream is determined to be anomalous in response to the next event of the current event not corresponding to a subnode of the target event. The target event may be construed as an event that is of the same type as the current event and exists in the event topological graph. If the type of the next event of the current event is the same as the type of an event in any subnode of the target event, the next event of the current event is regarded as corresponding to the subnode of the target event. The subnode of a node may be construed as a node connected to and located behind the node. Using a tree structure as an example, the subnode of a node is the branch node of the node. The advantage of this configuration is that whether there is an anomaly in the to-be-detected event stream at the event occurrence sequence level may be verified based on the conditional probability of two consecutive events so that anomaly detection can be performed quickly and accurately.

In one exemplary embodiment, the method further includes that the first time interval between the current event and the next event is acquired in response to the next event of the current event corresponding to the first subnode of the target event; the range of the transfer interval corresponding the target event and the first subnode is acquired; and the to-be-detected event stream is determined to be anomalous in response to the first time interval being not within the range of the transfer interval. The advantage of this configuration is that after the verification based on the conditional probability of two consecutive events is passed, whether the time interval of the occurrences of two events is within a reasonable range can be detected so that the accuracy of anomaly detection can be improved.

Figure 4:
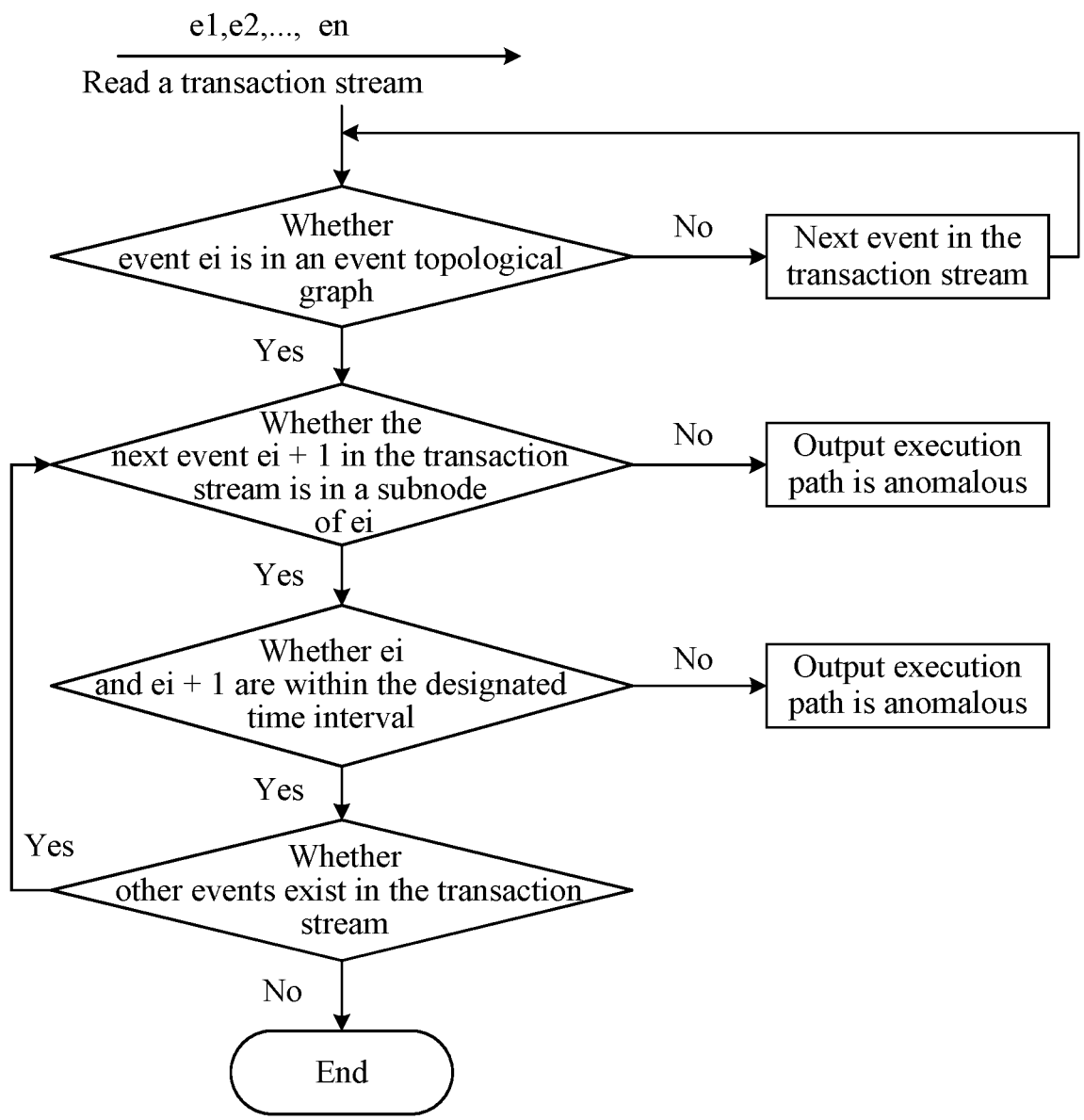
FIG. 4 is a flowchart of another anomaly detection method according to embodiments of the present application.

FIG. 4 is a flowchart of an anomaly detection method according to embodiments of the present application. As shown in FIG. 4, in the online stage of log detection, a transaction stream e1, e2, . . . , en is read. That is, a to-be-detected event stream is acquired. For the current event ei, whether ei exists in an event topological graph is determined. If ei is not in the event topological graph, as the new current event, the next event in the transaction stream is redetermined. If ei is in the event topological graph, whether the next event ei+1 of ei is in a subnode of ei in the event topological graph is determined. If ei+1 is not in the subnode of ei in the event topology, the output execution path is anomalous. If ei+1 is in the subnode of ei in the event topological graph, whether the interval between ei and ei+1 is within the designated time interval is determined. That is, whether the interval between ei and ei+1 is within the corresponding transfer interval range is determined. When the interval between ei and ei+1 is not within the designated time interval, the output execution path is anomalous. When the interval between ei and ei+1 is within the designated time interval, whether other events exist in the transaction stream is determined. If other events exist, ei+1 as the new ei is redetermined. If other events do not exist, the process is ended.

Figure 5:
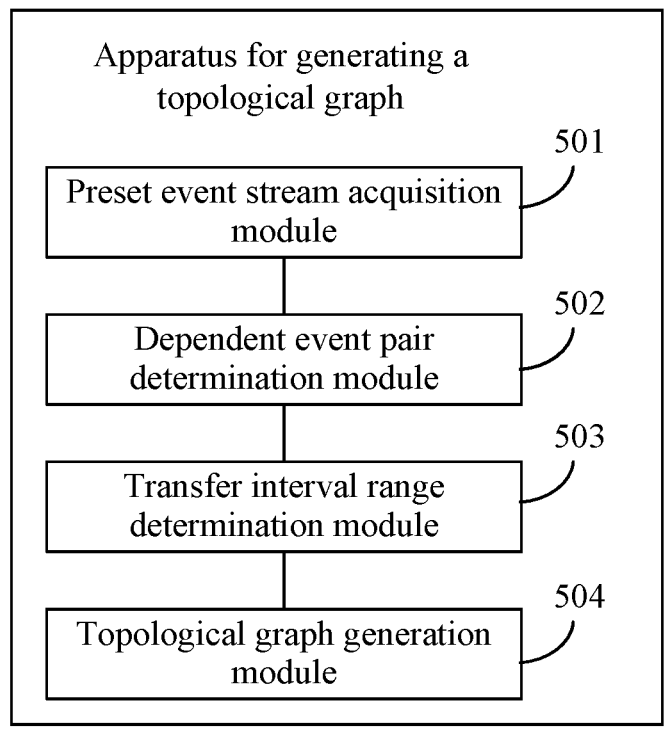
FIG. 5 is a block diagram of an apparatus for generating a topological graph according to embodiments of the present application.

FIG. 5 is a block diagram of an apparatus for generating a topological graph according to embodiments of the present application. The apparatus may be implemented by software and/or hardware and may be generally integrated on a computer device. The event topological graph may be generated by performing the method for generating a topological graph. As shown in FIG. 5, the apparatus includes a preset event stream acquisition module 501 configured to acquire a preset event stream, where the preset event stream corresponds to a normal log execution path; a dependent event pair determination module 502 configured to determine a dependent event pair in the preset event stream; a transfer interval range determination module 503 configured to determine the range of the transfer interval corresponding to the dependent event pair, where a transfer interval in transfer interval range represents the time difference between the occurrence time of two events in the dependent event pair; and a topological graph generation module 504 configured to generate an event topological graph according to the range of the transfer interval and the transfer probability corresponding to the dependent event pair, where the transfer probability represents the conditional probability between two events in the dependent event pair.

In the apparatus for generating a topological graph provided by this embodiment of the present application, the preset event stream corresponding to the normal log execution path is acquired, the dependent pair in the preset event stream is determined, the range of the transfer interval corresponding to the dependent event pair is determined, and the event topological graph is generated according to the range of the transfer interval and the transfer probability corresponding to the dependent event pair, where the transfer probability represents the conditional probability between two events. With the preceding technical solution adopted, the generated event topological graph includes the standard information of the normal log event stream in the two dimensions: the conditional probability of event occurrence and the time interval of occurrence and can be detected in these two dimensions to improve the detection accuracy when being used for log anomaly detection.

In one exemplary embodiment, the event topological graph includes multiple nodes, a node represents an event in the dependent event pair, and the connection between two nodes includes the transfer probability and the range of the transfer interval corresponding to the dependent event pair represented by the two nodes.

In one exemplary embodiment, that the event topological graph is generated according to the range of the transfer interval and the transfer probability corresponding to the dependent event pair includes that the maximum spanning tree is generated by using events included in the dependent event pair as nodes and by using the transfer probability corresponding to the dependent event pair as the edge weight between the nodes, and the range of the transfer interval corresponding to the dependent event pair is added to the edge in the maximum spanning tree to obtain the event topological graph.

In one exemplary embodiment, that the preset event stream is acquired includes that a preset log stream is acquired, where the preset log stream corresponds to the normal log execution path; logs in the preset log stream are parsed by using a preset log parsing algorithm to obtain multiple log templates, where each log template corresponds to one event; and the preset log stream is converted to the preset event stream corresponding to the preset log stream according to the multiple log templates.

In one exemplary embodiment, that the dependent event pair in the preset event stream is determined includes that for each event occurring in the preset event stream, a candidate subsequent event set corresponding to the current event is determined; whether the first preset dependency relationship is satisfied between the current event and each candidate subsequent event in the candidate subsequent event set corresponding to the current event is determined; and a candidate subsequent event satisfying the first preset dependency relationship is determined as a subsequent event and is added to a subsequent event set, where the current event and one subsequent event form one dependent event pair.

In one exemplary embodiment, that the candidate subsequent event set corresponding to the current event is determined includes that a first event existing between every two adjacent occurrences of the current event in the preset event stream is added to an initial candidate subsequent event set; the conditional probability between the current event and each first event is calculated; and a second event is removed from the initial candidate subsequent event set to obtain the candidate subsequent event set corresponding to the current event, where the conditional probability between the current event and the second event is less than a preset conditional probability threshold.

In one exemplary embodiment, that whether the first preset dependency relationship is satisfied between the current event and the each candidate subsequent event in the candidate subsequent event set corresponding to the current event is determined includes that for the each candidate subsequent event in the candidate subsequent event set corresponding to the current event, the unconditional distribution of the waiting time of the current candidate subsequent event is calculated; the conditional distribution of the waiting time of the current candidate subsequent event relative to the current event is calculated; and whether the first preset dependency relationship is satisfied between the current event and the current candidate subsequent event is determined according to the unconditional distribution and the conditional distribution, where the waiting time represents the time difference between the occurrence time of the current event and the occurrence time of the current candidate subsequent event.

In one exemplary embodiment, that whether the first preset dependency relationship is satisfied between the current event and the current candidate subsequent event is determined according to the unconditional distribution and the conditional distribution includes that the first preset dependency relationship is determined to be satisfied between the current event and the current candidate subsequent event in response to the unconditional distribution and the conditional distribution conforming to the normal distribution.

In one exemplary embodiment, that the range of the transfer interval corresponding to the dependent event pair is determined includes that for each dependent event pair, the time difference sequence corresponding to the current dependent event pair in the preset event stream is acquired and clustered, and the range of the transfer interval corresponding to the current dependent event pair is determined according to the time distribution in the cluster obtained by the clustering, where the time difference sequence includes the time difference between adjacent occurrences of the two events in the current dependent event pair.

In one exemplary embodiment, that the range of the transfer interval corresponding to the current dependent event pair is determined according to the time distribution in the cluster obtained by the clustering includes that the range of the transfer interval corresponding to the current dependent event pair is determined according to the maximum value and the minimum value in the cluster; or the range of the transfer interval corresponding to the current dependent event pair is determined according to a confidence interval of the time distribution in the cluster.

In one exemplary embodiment, that the range of the transfer interval corresponding to the current dependent event pair is determined according to the time distribution in the cluster obtained by the clustering includes that the current dependent event pair is tested by using a preset statistical test method, and the range of the transfer interval corresponding to the current dependent event pair is determined according to the time distribution in the cluster in response to passing the test.

In one exemplary embodiment, the apparatus further includes an edge completion module configured to, after the maximum spanning tree is generated, for two nodes in any dependent event pair in the maximum spanning tree, calculate the detour probability that a detour path that exists between the two current nodes and complete the edge between the two current nodes in response to the detour probability being greater than a preset detour probability threshold.

In one exemplary embodiment, that the edge between the two current nodes is completed includes that the edge is completed by using the sum of weights of all edges passed by a target detour path between the two current nodes as the edge weight between the two current nodes, where the target detour path satisfies that the sum of the weights of the all edges passed by the target detour path is larger than the sum of weights of all edges passed by any other detour path between the two current nodes.

Figure 6:
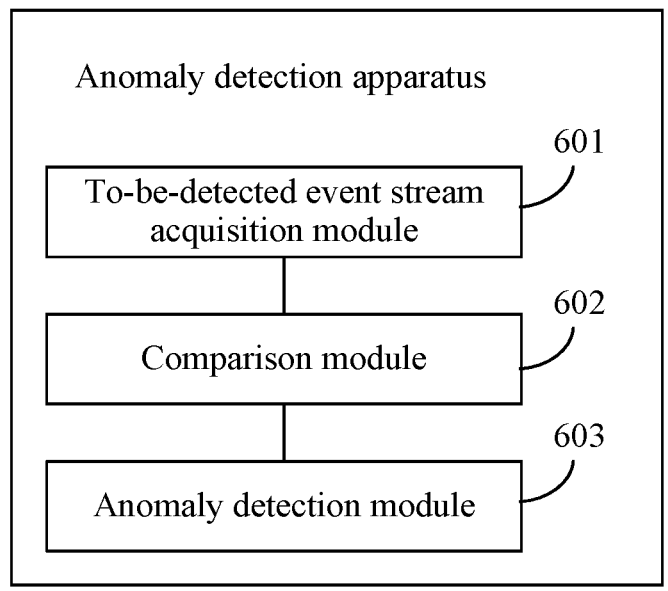
FIG. 6 is a block diagram of an anomaly detection apparatus according to embodiments of the present application.

FIG. 6 is a block diagram of an anomaly detection apparatus according to embodiments of the present application. The apparatus may be implemented by software and/or hardware and may be generally integrated on a server. The log anomaly detection may be implemented by performing the anomaly detection method. As shown in FIG. 6, the apparatus includes a to-be-detected event stream acquisition module 601 configured to acquire a to-be-detected event stream, where the to-be-detected event stream corresponds to a to-be-detected log execution path; a comparison module 602 configured to compare the to-be-detected event stream with an event topological graph, where the event topological graph is generated by using the method for generating a topological graph according to the embodiments of the present application; and an anomaly detection module 603 configured to determine whether the to-be-detected event stream is anomalous according to a comparison result.

In the anomaly detection apparatus according to this embodiment of the present application, the to-be-detected event stream corresponding to the to-be-detected log execution path is compared with the event topological graph generated by using the method for generating a topological graph according to the embodiments of the present application so that whether the to-be-detected event stream is anomalous can be detected quickly and accurately according to the comparison result, thereby improving the accuracy and the efficiency of log anomaly detection.

In one exemplary embodiment, the event topological graph includes multiple nodes, a node represents an event in the dependent event pair, and the connection between two nodes includes the transfer probability and the range of the transfer interval corresponding to the dependent event pair represented by the two nodes; that the to-be-detected event stream is compared with the event topological graph, and whether the to-be-detected event stream is anomalous is determined according to the comparison result includes that for the current event in the to-be-detected event stream, a corresponding target event is searched in the event topological graph; and the to-be-detected event stream is determined to be anomalous in response to the next event of the current event not corresponding to a subnode of the target event.

In one exemplary embodiment, the anomaly detection apparatus 603 is further configured to acquire the first time interval between the current event and the next event in response to the next event of the current event corresponding to the first subnode of the target event; acquire the range of the transfer interval corresponding to the target event and the first subnode; and determine the to-be-detected event stream to be anomalous in response to the first time interval being not within the range of the transfer interval.

Figure 7:
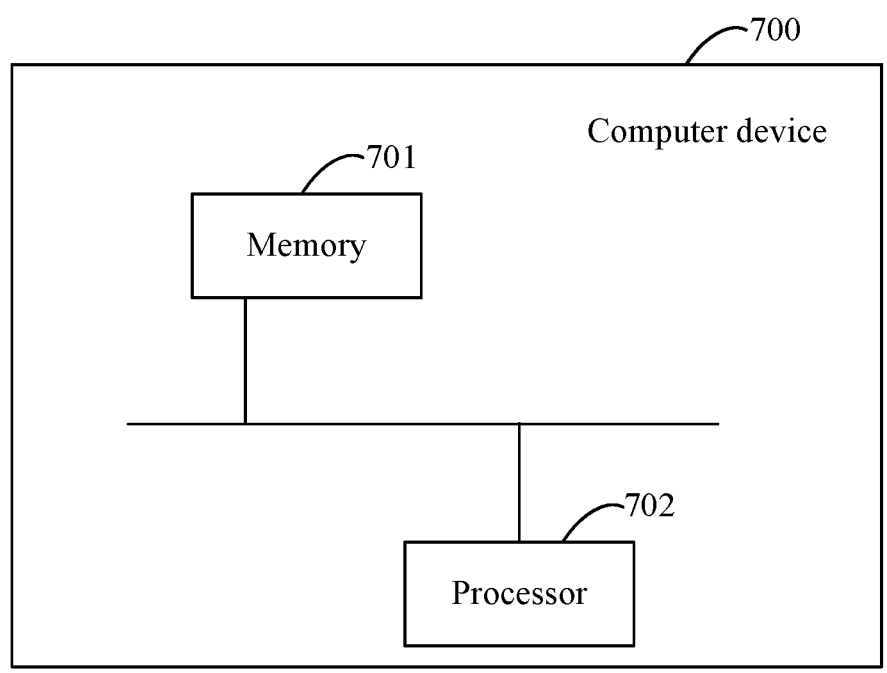
FIG. 7 is a block diagram of a computer device according to embodiments of the present application.

Embodiments of the present application provide a computer device in which the apparatus for generating a topological graph and/or the anomaly detection apparatus according to embodiments of the present application can be integrated. FIG. 7 is a block diagram of a computer device according to embodiments of the present application. The computer device 700 may include a memory 701, a processor 702 and a computer program stored on the memory 701 and operable on the processor 702. The processor 702 is configured to execute the computer program to perform the method for generating a topological graph and/or the anomaly detection method according to embodiments of the present application.

Embodiments of the present application further provide a non-transitory storage medium including a computer-executable instruction. When executed by a computer processor, the computer-executable instruction is used for causing the computer processor to perform the method for generating a topological graph and/or the anomaly detection method according to any embodiment of the present application.

The method for generating a topological graph, the anomaly detection apparatus, the computer device and the storage medium provided by the preceding embodiments may perform the methods provided in the corresponding embodiments and have functional modules corresponding to the execution methods. For technical details not described in the preceding embodiments, reference may be made to the methods provided by the corresponding embodiments of the present application.

It is to be understood by those skilled in the art that the term computer device encompasses any appropriate type of device capable of performing a computer program, such as a mobile phone, a portable data processing apparatus, a portable web browser or a vehicle-mounted mobile station.

In general, multiple embodiments of the present application may be implemented in hardware or dedicated circuits, software, logics or any combination thereof. For example, some aspects may be implemented in hardware while other aspects may be implemented in firmware or software that may be executed by a controller, a microprocessor or another computing apparatus, though the present application is not limited thereto.

The embodiments of the present application may be implemented by computer program instructions executed by a data processor of a mobile apparatus, for example, implemented in a processor entity, by hardware or by a combination of software and hardware. The computer program instructions may be assembly instructions, instruction set architecture (ISA) instructions, machine instructions, machine-related instructions, microcodes, firmware instructions, status setting data or source or object codes written in any combination of one or more programming languages.

A block diagram of any logic flow among the drawings of the present application may represent program steps, may represent interconnected logic circuits, modules and functions, or may represent a combination of program steps with logic circuits, modules and functions. Computer programs may be stored in the memory. The memory may be of any type suitable for the local technical environment and may be implemented using any suitable data storage technology, such as, but not limited to, a read-only memory (ROM), a random-access memory (RAM) and an optical memory device and system (a digital video disc (DVD) or a compact disc (CD)). The computer-readable medium may include a non-transitory storage medium. The data processor may be of any type suitable for the local technical environment, such as, but not limited to, a general-purpose computer, a special-purpose computer, a microprocessor, a digital signal processing (DSP), an application specific integrated circuit (ASIC), a field-programmable gate array (FPGA), and a processor based on a multi-core processor architecture.

What is claimed is:

1. A method for generating a topological graph, comprising:
   acquiring a preset event stream, wherein the preset event stream corresponds to a normal log execution path;
   determining a dependent event pair in the preset event stream;
   determining a range of a transfer interval corresponding to the dependent event pair, wherein the transfer interval represents a time difference between adjacent occurrences of two events in the dependent event pair; and
   generating an event topological graph according to the range of the transfer interval and a transfer probability corresponding to the dependent event pair, wherein the transfer probability represents a conditional probability between the two events in the dependent event pair.

2. The method according to claim 1, wherein the event topological graph comprises a plurality of nodes, a node among the plurality of nodes represents an event in the dependent event pair, and a connection between two nodes among the plurality of nodes comprises the range of the transfer interval and the transfer probability corresponding to a dependent event pair represented by the two nodes among the plurality of nodes.

3. The method according to claim 2, wherein generating the event topological graph according to the range of the transfer interval and the transfer probability corresponding to the dependent event pair comprises:
   generating a maximum spanning tree by using events comprised in the dependent event pair as nodes and by using the transfer probability corresponding to the dependent event pair as a weight of an edge between the nodes; and
   adding the range of the transfer interval corresponding to the dependent event pair to the edge in the maximum spanning tree to obtain the event topological graph.

4. The method according to claim 1, wherein acquiring the preset event stream comprises:
   acquiring a preset log stream, wherein the preset log stream corresponds to the normal log execution path;
   parsing logs in the preset log stream by using a preset log parsing algorithm to obtain a plurality of log templates, wherein each of the plurality of log templates corresponds to one event; and
   converting the preset log stream into the preset event stream corresponding to the preset log stream according to the plurality of log templates.

5. The method according to claim 1, wherein determining the dependent event pair in the preset event stream comprises:
   determining a candidate subsequent event set corresponding to each event in the preset event stream; determining whether a first preset dependency relationship is satisfied between the each event and each candidate subsequent event in the candidate subsequent event set corresponding to the each event; and determining a candidate subsequent event satisfying the first preset dependency relationship to be a subsequent event and adding the subsequent event to a subsequent event set, wherein each event and one subsequent event of the each event form one dependent event pair.

6. The method according to claim 5, wherein determining the candidate subsequent event set corresponding to the each event in the preset event stream comprises:
   adding a first event existing between every two adjacent occurrences of the each event in the preset event stream to an initial candidate subsequent event set;
   calculating a conditional probability between the each event and each first event; and
   removing a second event from the initial candidate subsequent event set to obtain the candidate subsequent event set corresponding to the each event, wherein a conditional probability between the each event and the second event is less than a preset conditional probability threshold.

7. The method according to claim 5, wherein determining whether the first preset dependency relationship is satisfied between the each event and the each candidate subsequent event in the candidate subsequent event set corresponding to the each event comprises:
   calculating an unconditional distribution of a waiting time of the each candidate subsequent event in the candidate subsequent event set corresponding to the each event;
   calculating a conditional distribution of a waiting time of the each candidate subsequent event relative to the each event; and determining whether the first preset dependency relationship is satisfied between the each event and the each candidate subsequent event according to the unconditional distribution and the conditional distribution, wherein the waiting time represents a time difference between an occurrence time of the each event and an occurrence time of the each candidate subsequent event.

8. The method according to claim 7, wherein determining whether the first preset dependency relationship is satisfied between the each event and the each candidate subsequent event according to the unconditional distribution and the conditional distribution comprises:
   determining that the first preset dependency relationship is satisfied between the each event and the each candidate subsequent event in response to the unconditional distribution and the conditional distribution conforming to a normal distribution.

9. The method according to claim 1, wherein in a case of a plurality of dependent event pairs, determining the range of the transfer interval corresponding to the dependent event pair comprises:
   acquiring a time difference sequence corresponding to each dependent event pair of the plurality of dependent event pairs in the preset event stream, clustering the time difference sequence to obtain a cluster, and determining the range of the transfer interval corresponding to each dependent event pair according to a time distribution in the cluster, wherein the time difference sequence comprises a time difference between adjacent occurrences of two events in each dependent event pair.

10. The method according to claim 9, wherein determining the range of the transfer interval corresponding to the each of the plurality of the dependent event pairs according to the time distribution in the cluster comprises:

determining the range of the transfer interval corresponding to the each of the plurality of the dependent event pairs according to a maximum value and a minimum value in the cluster; or determining the range of the transfer interval corresponding to the each of the plurality of the dependent event pairs according to a confidence interval of the time distribution in the cluster.

11. The method according to claim 9, wherein determining the range of the transfer interval corresponding to the each of the plurality of the dependent event pairs according to the time distribution in the cluster comprises:

testing the each of the plurality of dependent event pairs by using a preset statistical test method, and determining the range of the transfer interval corresponding to the each of the plurality of the dependent event pairs according to the time distribution in the cluster in a case where the testing is past.

12. The method according to claim 3, after generating the maximum spanning tree, the method further comprising:

calculating a detour probability of a detour path that exists between two nodes in any dependent event pair in the maximum spanning tree, and completing an edge between the two nodes in response to the detour probability being greater than a preset detour probability threshold.

13. The method according to claim 12, wherein completing the edge between the two nodes comprises:

completing the edge by using a sum of weights of all edges passed by a target detour path between the two nodes as a weight of an edge between the two nodes, wherein the target detour path satisfies that the sum of the weights of the all edges passed by the target detour path is larger than a sum of weights of all edges passed by any other detour path between the two nodes.

14. An anomaly detection method, comprising:

acquiring a to-be-detected event stream, wherein the to-be-detected event stream corresponds to a to-be-detected log execution path;

comparing the to-be-detected event stream with an event topological graph, wherein the event topological graph is generated by using the method for generating a topological graph according to claim 1; and determining whether the to-be-detected event stream is anomalous according to a comparison result.

15. The method according to claim 14, wherein the event topological graph comprises a plurality of nodes, a node among the plurality of nodes represents an event in a dependent event pair, and a connection between two of the plurality of nodes comprises a range of a transfer interval and a transfer probability corresponding to a dependent event pair represented by the two of the plurality of nodes; and comparing the to-be-detected event stream with the event topological graph and determining whether the to-be-detected event stream is anomalous according to the comparison result comprise:

searching, in the event topological graph, for a target event corresponding to each event in the to-be-detected event stream; and determining the to-be-detected event stream to be anomalous in response to a next event of the each event not corresponding to a subnode of the target event.

16. The method according to claim 15, further comprising:

acquiring a first time interval between the each event and the next event in response to the next event of the each event corresponding to a first subnode of the target event;

acquiring a range of a transfer interval corresponding to the target event and the first subnode; and determining the to-be-detected event stream to be anomalous in response to the first time interval being not within the range of the transfer interval.

17. An apparatus for generating a topological graph, comprising:

a processor and a memory storing processor-executable instructions which, when executed by the processor, cause the processor to:

acquire a preset event stream, wherein the preset event stream corresponds to a normal log execution path;

determine a dependent event pair in the preset event stream;

determine a range of a transfer interval corresponding to the dependent event pair, wherein a transfer interval in the range of the transfer interval represents a time difference between adjacent occurrences of two events in the dependent event pair; and generate an event topological graph according to the range of the transfer interval and a transfer probability corresponding to the dependent event pair, wherein the transfer probability represents a conditional probability between the two events in the dependent event pair.

18. An anomaly detection apparatus, comprising:

a processor and a memory storing processor-executable instructions which, when executed by the processor, cause the processor to:

acquire a to-be-detected event stream, wherein the to-be-detected event stream corresponds to a to-be-detected log execution path;

compare the to-be-detected event stream with an event topological graph, wherein the event topological graph is generated by using the method for generating a topological graph according to claim 1; and determine whether the to-be-detected event stream is anomalous according to a comparison result.

19. A computer device, comprising a processor and a memory, wherein the processor is configured to execute a program stored in the memory to perform the method according to claim 1.

20. A non-transitory storage medium storing a computer program which, when executed by a processor, causes the processor to perform the method according to claim 1.

* * * * *